United States Patent
Huang et al.

(10) Patent No.: US 11,622,263 B2
(45) Date of Patent: Apr. 4, 2023

(54) WIRELESS REPEATER DEVICE AND CONFIGURATION METHOD FOR THE SAME

(71) Applicant: REALTEK SEMICONDUCTOR CORP., Hsinchu (TW)

(72) Inventors: Chin-Min Huang, Hsinchu (TW); Chin-Yu Hsu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 108 days.

(21) Appl. No.: 17/354,182

(22) Filed: Jun. 22, 2021

(65) Prior Publication Data

US 2022/0159454 A1    May 19, 2022

(30) Foreign Application Priority Data

Nov. 13, 2020 (TW) ................................. 109139632

(51) Int. Cl.
*H04W 8/26*     (2009.01)
*H04W 76/10*    (2018.01)
*H04L 61/5014*  (2022.01)

(52) U.S. Cl.
CPC .......... *H04W 8/26* (2013.01); *H04L 61/5014* (2022.05); *H04W 76/10* (2018.02)

(58) Field of Classification Search
CPC ................................ H04W 8/26; H04L 12/50

USPC .......................................................... 370/329
See application file for complete search history.

(56) References Cited

U.S. PATENT DOCUMENTS

2013/0343390 A1*  12/2013  Moriarty ................. H04L 43/50
                                                  370/392

FOREIGN PATENT DOCUMENTS

CN      100502413 C     6/2009
EP      3048756 B1      9/2019

\* cited by examiner

*Primary Examiner* — Dang T Ton
(74) *Attorney, Agent, or Firm* — Li & Cai Intellectual Property (USA) Office

(57) ABSTRACT

A wireless repeater device and a configuration method for the same are provided. The wireless repeater device is configured to: connect to a target network provided by a DHCP server; send a detection packet to the target network to confirm transmission modes supported by the DHCP server; confirm whether a request for dynamically obtaining an IP address from a client device is received; forward a request packet to the DHCP server, which instructs the DHCP server to respond in a first transmission mode; receive a response to the request from the DHCP server and forward it to the client device; confirm whether the request from the client device is still received, if so, modify the request packet and forward it to the DHCP server, and the request packet is modified to instruct the DHCP server to respond in a second transmission mode.

14 Claims, 4 Drawing Sheets

WIRELESS REPEATER DEVICE AND CONFIGURATION METHOD FOR THE SAME

CROSS-REFERENCE TO RELATED PATENT APPLICATION

This application claims the benefit of priority to Taiwan Patent Application No. 109139632, filed on Nov. 13, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless repeater device and a configuration method for the same, and more particularly to a wireless repeater device and a configuration method for the same that can improve network connection efficiency.

BACKGROUND OF THE DISCLOSURE

With the advent of Internet of Things (IoT), wireless networking devices are further applied to things in everyday life. The wireless networking devices may be located far away from a target wireless network, and an assistance of a wireless repeater is required to increase a coverage of the wireless network, thereby improving efficiency and quality of the network connection. At present, some commercial wireless repeater products are capable of improving the coverage of wireless networks, allowing mobile devices (such as mobile phones) or personal computers to overcome issues of providing poor network experiences due to distance.

However, there are Dynamic Host Configuration Protocol (DHCP) compatibility issues between the wireless repeater and the target network, which causes the client device to, when connecting to the network through the wireless repeater in the initialization phase, take many attempts to successfully acquire an IP address configured by the target network and achieve a smooth network connection, making the process a time-consuming ordeal; or, the IP address configured by the target network cannot be acquired at the end and the connection fails.

In detail, the DHCP supports broadcast and unicast transmission. In a process of dynamically acquiring an IP address, the DHCP client usually sends a request to the DHCP server to acquire the IP address. However, the DHCP client connected through the wireless repeater cannot acknowledge which manners the target network supports for allocating the IP addresses, and the wireless repeater can try to forward the request of the DHCP client to the target network in order to acquire the IP address with broadcast, and expects the target network to respond with broadcast too.

There is a risk of packet dropping when the existing broadcast manner is used for packet transmission in the wireless network. In order to address issues of broadcast packets dropping in a wireless network environment, existing wireless repeaters often use the unicast transmission to forward the request of the DHCP client to acquire the IP address. However, in a case of uncertainty in terms of whether or not the target wireless network supports unicast response, a default unicast forwarding can have risks, including that the DHCP client may fail to acquire the IP address and results in an unsuccessful network connection.

Therefore, improving the DHCP connection mechanism to improve network connection efficiency has become one of the important issues in the art.

SUMMARY OF THE DISCLOSURE

In response to the above-referenced technical inadequacies, the present disclosure provides a wireless repeater device and a configuration method for the same that can improve an efficiency of network connection.

In one aspect, the present disclosure provides a wireless repeater device, which includes a transceiver circuit and a control circuit connected to the transceiver circuit. The control circuit is configured to: connect to a target network provided by a Dynamic Host Configuration Protocol (hereinafter referred to as DHCP) server through the transceiver circuit; dynamically acquire an Internet Protocol (hereinafter referred to as IP) address from the DHCP server through the transceiver circuit; send a detection packet to the target network through the transceiver circuit to confirm a first transmission mode and a second transmission mode supported by the DHCP server, in which the detection packet indicates that the wireless repeater device is a DHCP relay agent; confirm whether a client device is connected through the transceiver circuit; in response to confirming that the client device is connected, confirm, through the transceiver circuit, whether a request for dynamically acquiring an IP address from the client device is received; in response to confirming that the request is received, forward a request packet including the request to the DHCP server of the target network through the transceiver circuit, in which the request packet instructs the DHCP server to respond in the first transmission mode; receive a response from the DHCP server to the request through the transceiver circuit, and forward the response to the client device; confirm, through the transceiver circuit, whether the request from the client device is still continuously received; in response to confirming that the request is still continuously received, modify the request packet including the request and forward the modified request packet to the DHCP server through the transceiver circuit, in which the request packet is modified to instruct the DHCP server to respond in the second transmission mode; and receive another response from the DHCP server to the request through the transceiver circuit, and forward the another response to the client device, such that the client device acquires another IP address to connect to the target network.

In another aspect, the present disclosure provides a configuration method for a wireless repeater device, the wireless repeater device includes a transceiver circuit and a control circuit connected to the transceiver circuit, and the configuration method includes: configuring the control circuit to: connect to a target network provided by a Dynamic Host Configuration Protocol (DHCP) server through the transceiver circuit; dynamically acquire an Internet Protocol (IP) address from the DHCP server through the transceiver circuit; send a detection packet to the target network through the transceiver circuit to confirm a first transmission mode and a second transmission mode supported by the DHCP server, in which the detection packet indicates that the wireless repeater device is a DHCP relay agent; confirm whether a client device is connected through the transceiver circuit; in response to confirming that the client device is connected, confirm, through the transceiver circuit, whether a request for dynamically acquiring an IP address from the client device is received; in response to confirming that the request is received, forward a request packet including the request to the DHCP server of the target network through the transceiver circuit, in which the request packet instruct the DHCP server to respond in the first transmission mode; receive a response from the DHCP server to the request through the transceiver circuit, and forward the response to the client device; confirm, through the transceiver circuit, whether the request from the client device is still continuously received; in response to confirming that the request is still continuously received, modify the request packet including the request and forward the modified request packet to the DHCP server through the transceiver circuit, in which the request packet is modified to instruct the DHCP server to respond in the second transmission mode; and receive another response from the DHCP server to the request through the transceiver circuit, and forward the another response to the client device, such that the client device acquires another IP address to connect to the target network.

Therefore, the wireless repeater device and the configuration method for the same provided by the present disclosure can dynamically detect the transmission modes supported by the target network for dynamically acquiring the IP address, without the need for the client device to try and connect to the network through the wireless repeater device. The wireless repeater device can be used by the client device to forward the request for acquiring the IP address to the target network through the detected transmission mode, thereby increasing the wireless network coverage and improving the network connection efficiency through the wireless repeater device without limiting the compatibility of transmission modes, such that wireless networking devices can be more adaptive.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Drawings of the present disclosure are merely schematic illustrations, and are not depicted in actual size. The following embodiments will further describe related technical content of the present disclosure in detail, but the provided content is not intended to limit the scope of the present disclosure.

The use of examples anywhere in this specification including examples of any terms is illustrative only, and in no way limits the scope and meaning of the present disclosure or of any exemplified term. Likewise, the present disclosure is not limited to various embodiments given herein. In addition, the term "or" used in the present disclosure shall, depending on the actual situation, possibly include any one or a combination of the related listed items.

Figure 1:
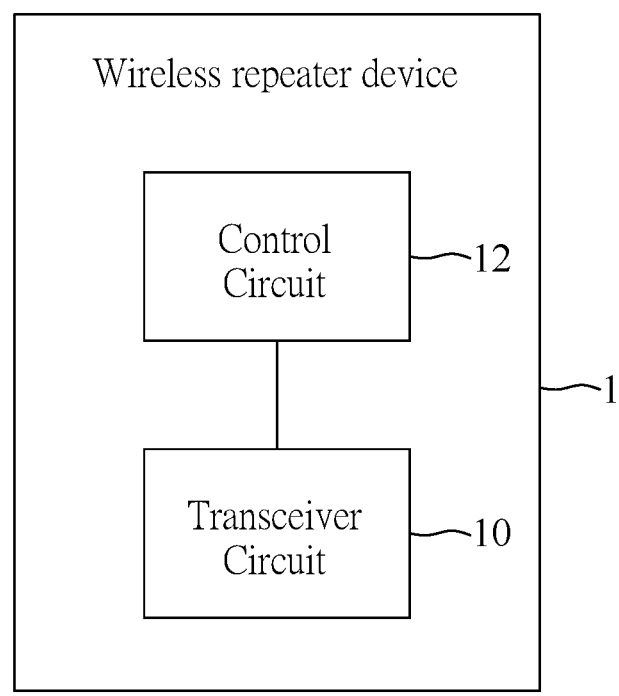
FIG. 1 is a block diagram of a wireless repeater device according to an embodiment of the present disclosure.

FIG. 1 is a block diagram of a wireless repeater device according to an embodiment of the present disclosure. Referring to FIG. 1, an embodiment of the present disclosure provides a wireless repeater device 1, which includes a transceiver circuit 10 and a control circuit 12 connected to the transceiver circuit 10.

In some embodiments, the control circuit 12 can include, for example, a processor and a memory, so as to execute software applications to enable the control circuit 12 to perform DHCP relay operations. The control circuit 12 can also be a software program segment with specific functions, which is stored in a computer-readable storage medium or other storage apparatuses, and can be executed by a computer or other computing devices containing a processor, thereby completing the operational workflow of the DHCP relay in the present disclosure.

In some embodiments, the transceiver circuit 10 can include, for example, a radio frequency (RF) transceiver circuit configured to perform radio communication according to one or more applicable air interface protocols, and can include, for example, a wireless receiver, a wireless transmitter, and corresponding antenna units.

Figure 2:
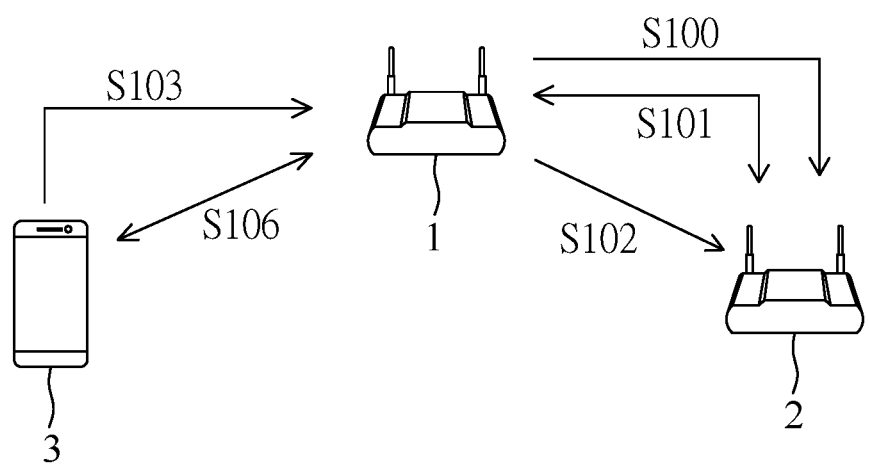
FIG. 2 is a schematic structural diagram of a wireless repeater device applied to a client device and a DHCP server according to an embodiment of the present disclosure.
Figure 3:
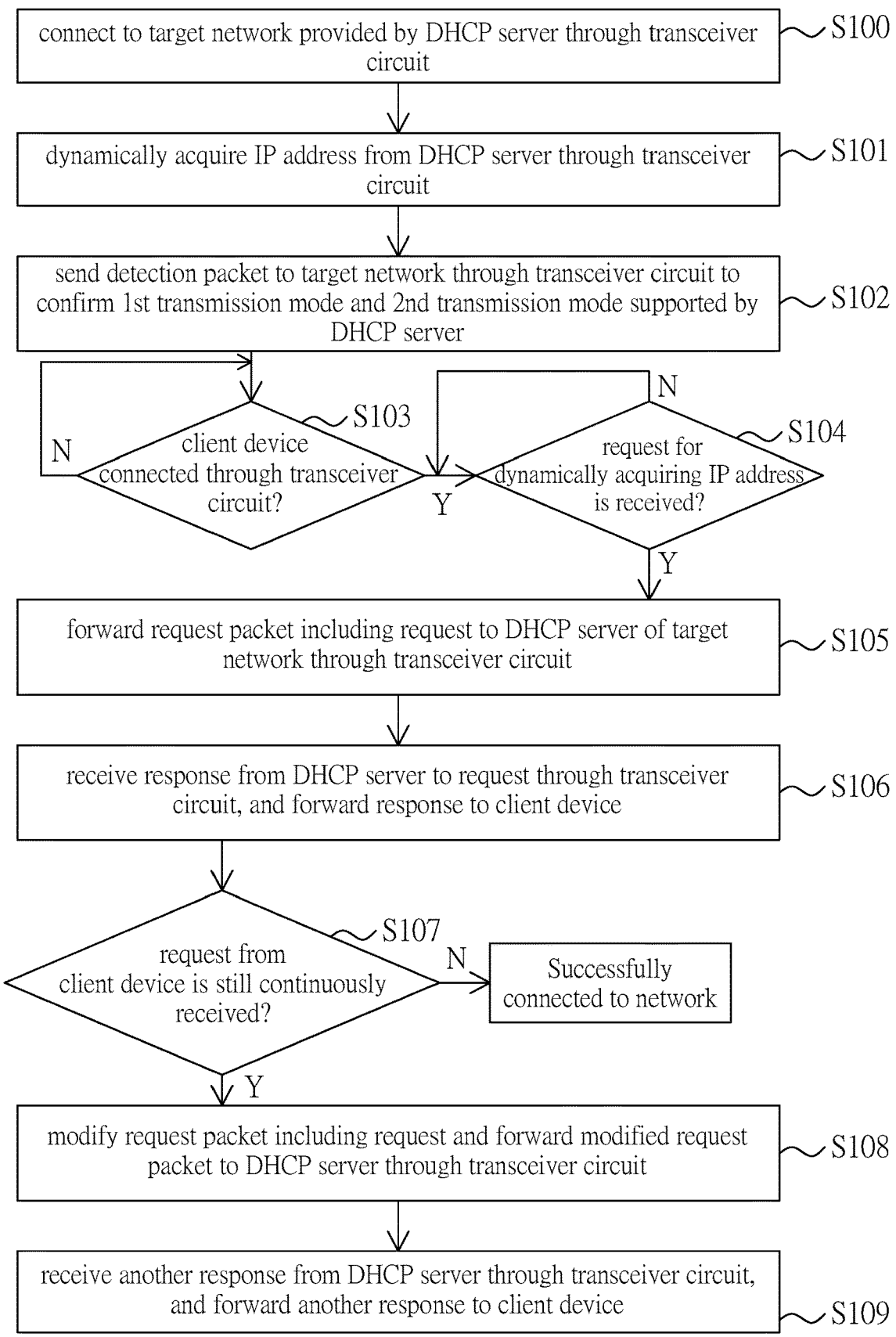
FIG. 3 is a flowchart of a configuration method for a wireless repeater device according to an embodiment of the present disclosure.

Reference is further made to FIG. 2 and FIG. 3. FIG. 2 is a schematic diagram of a structure showing a wireless repeater device applied to a client device and a DHCP server according to an embodiment of the present disclosure, and FIG. 3 is a flowchart of a configuration method for a wireless repeater device according to an embodiment of the present disclosure.

The configuration method for the wireless repeater device of the present disclosure will be described below with reference to the schematic diagram of FIG. 2 and the flowchart of FIG. 3. As shown in FIG. 2, the wireless repeater device 1 can be applied between the DHCP server 2 and the client device 3 to increase coverage of a target network provided by the DHCP server 2.

In order for the wireless repeater device 1 to dynamically detect a mode of a dynamic host configuration protocol (DHCP) that the target network supports, the wireless repeater device 1 requires the following capabilities. First, the wireless repeater device 1 is able to wirelessly connect and be connected to the network; secondly, the wireless repeater device 1 supports a client mode in the DHCP.

In detail, when the wireless repeater device 1 operates in the client mode, a process of obtaining information such as an IP address through the DHCP can be divided into four phases, including a discovery phase, an offer phase, a selection phase, and an acknowledgement phase. The discovery phase is a phase where the DHCP client discovers the DHCP server, the offer phase is a phase where the DHCP server provides an IP address, the selection phase is a phase where the DHCP client selects the IP address, and the acknowledgement phase is a phase where the DHCP server confirms the assigned IP address. In the above-mentioned DHCP operations, the four phases further involve four types of data packets, which will not be repeated herein.

Referring to FIG. 3, the configuration method for the wireless repeater device can configure the control circuit 12 to perform the following steps:

In step S100, a connection with the target network provided by the DHCP server 2 is established through the transceiver circuit 10. A signal transmission path of step S100 is shown in FIG. 2.

In step S101, an IP address from the DHCP server 2 is dynamically acquired through the transceiver circuit 10. Step S100 and step S101 are similar to the above-mentioned discovery phase, offer phase, selection phase, and acknowledgement phase, which will not be repeated herein. A signal transmission path of step S101 is shown in FIG. 2.

In step S102, a detection packet is sent to the target network through the transceiver circuit 10 in order to confirm a first transmission mode and a second transmission mode supported by the DHCP server 2. The detection packet includes an indication field that identifies information for showing the DHCP server whether the wireless repeater device 1 is a DHCP relay agent or a DHCP client, and in this step, the detection packet sent by the wireless repeater device 1 indicates that the wireless repeater device 1 is the DHCP relay agent. When the indication field indicates that the wireless repeater device 1 is the DHCP client, the DHCP server 2 will treat the wireless repeater device 1 as the DHCP client and perform corresponding actions. When the indication field indicates that the wireless repeater device 1 is the DHCP relay agent, the DHCP server will treat the wireless repeater device 1 as the DHCP relay agent and perform corresponding actions. A signal transmission path of step S102 is shown in FIG. 2.

The DHCP relay agent is used in the DHCP to implement a message interchange between the DHCP server and the DHCP client between different network segments. The DHCP relay agent is responsible for a relay service between the DHCP client and the DHCP server located in different network segments. The DHCP relay agent transmits DHCP messages across network segments to a destination DHCP server, such that the DHCP clients on the network can share the DHCP server.

It is noted that this step essentially allows the wireless repeater device 1 to imitate the DHCP relay agent, so as to obtain relevant information such as the transmission modes supported by the DHCP server 2 during the communication with the DHCP server 2. In some embodiments, the first transmission mode is a unicast mode, and the second transmission mode is a broadcast mode.

Figure 4:
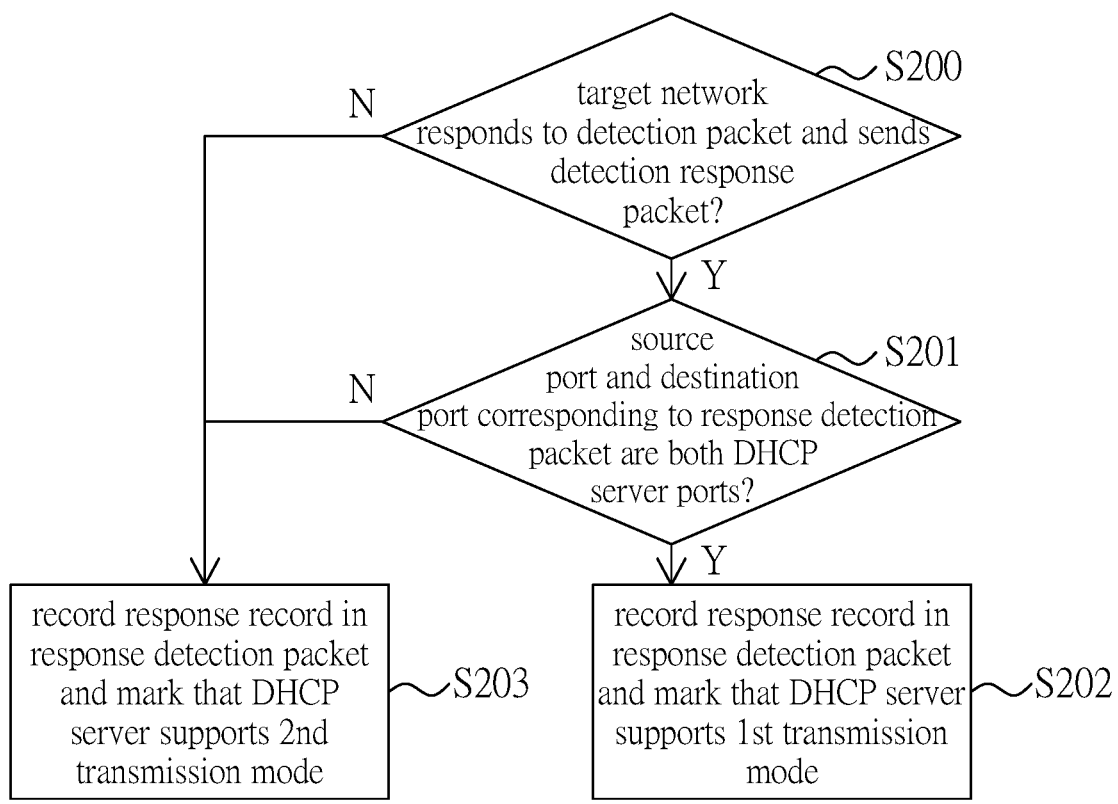
FIG. 4 is a detailed flowchart of step S102 in FIG. 3.

In detail, reference can be further made to FIG. 4, which is a detailed flowchart of step S102 in FIG. 3. Step S102 of configuring the control circuit to confirm the first transmission mode and the second transmission mode supported by the DHCP server 2 further includes configuring the control circuit 12 to perform following steps.

In step S200, whether a detection response packet, which is sent by the target network in response to the detection packet, is confirmed through the transceiver circuit 10.

In response to receiving the detection response packet through the transceiver circuit 10, the method proceeds to step S201. In step S201, whether a source port and a destination port corresponding to the detection response packet are both DHCP server ports is confirmed. This step is to ensure that the DHCP server has identified the wireless repeater device 1 as the DHCP relay agent. In a protocol structure associated with the DHCP relay agent, the detection response packet includes related information, such as the transmission modes supported by DHCP server 2.

In response to confirming that both the source port and the destination port corresponding to the detection packet are the DHCP server ports, the method proceeds to step S202. In step S202, a response record in the detection response packet is recorded and the DHCP server is marked as supporting the first transmission mode, for example, the unicast mode.

In response to confirming that any of the source port and the destination port corresponding to the detection packet are is not the DHCP server port, the method proceeds to step S203. In step S203, a response record in the detection response packet is recorded and the DHCP server is marked as supporting the second transmission mode, for example, the broadcast mode. The response record includes content and time of the response from the DHCP server 2 of the target network. The content can include a media access control (MAC) address and a basic service set identifier (BSSID) of the DHCP server 2, and the transmission modes supported by the DHCP server 2, in which the content being used to identify the transmission modes supported by the DHCP server 2 is related to a unique MAC address of the DHCP server 2, but the present disclosure is not limited thereto. In addition, if the transceiver circuit 10 confirms that the target network fails to response to the detection packet in step S200, the method also proceeds to step S203.

Referring back to FIG. 3, the configuration method then proceeds to step S103. In step S103, whether a connection of a client device 3 is confirmed through the transceiver circuit 10. If there is no client device 3 in connection, the transceiver circuit 10 continues to execute the step S103 until a client device 3 is in connection. A signal transmission path of step S103 is shown in FIG. 2.

In response to confirming that the client device 3 is connected, the method proceeds to step S104. In step S104, whether a request for dynamically acquiring IP address from the client device 3 (referred to as "the request" hereinafter) is confirmed through the transceiver circuit 10. If the request from the client device 3 is not received, the method continuously performs step S104 until the request from the client device 3 is received.

In response to confirming that the request is received, the method proceeds to step S105. In step S105, a request packet including the request is forwarded to the DHCP server 2 of the target network through the transceiver circuit 10. In this case, the request packet carries instructions to control the DHCP server to respond in the first transmission mode.

In detail, when the request packet carrying instructions to control the DHCP server to respond in the first transmission mode or the second transmission mode is received by the DHCP server 2, the DHCP server 2 is forced to use the first transmission mode (i.e., unicast mode) or the second transmission mode (i.e., broadcast mode) to send a response to the request for dynamic acquiring the IP address. In some embodiments, the request packet can include a transmission mode field that identifies information for instructing the DHCP server to respond in the first transmission mode or the second transmission mode.

In step S106, the response corresponding to the request from the DHCP server 2 is received through the transceiver circuit 10, and the response is forwarded to the client device 3. A signal transmission path of step S106 is shown in FIG. 2.

In step S107, whether a transmission of the request from the client device 3 being still received is confirmed through the transceiver circuit 10. In other words, if the client device 3 has successfully acquired an IP address through the response in step S106, the client device 3 will stop sending the request, which represents that the transmission mode used by the client device 3 is compatible with the transmission mode used by the DHCP server 2, and the client device 3 is successfully connected to the network. However, if the transceiver circuit 10 keeps receiving the request, it represents that the client device 3 fails to acquire an IP address through the response so the client device 3 is operating in a retry state, which triggers a continuous transmission of the request directed to the wireless repeater device 1.

In response to confirming that the transmission of the request is still received, the method proceeds to step S108: the request packet carrying the request is modified and the modified request packet is forwarded to the DHCP server 2 through the transceiver circuit 10. In detail, the request packet is modified to instruct the DHCP server to respond in the second transmission mode. For example, information of the transmission mode field in the request packet can be modified to instruct the DHCP server 2 to respond in the second transmission mode.

After the modified request packet is forwarded to the DHCP server 2, the DHCP server 2 switches from the first transmission mode to the second transmission mode according to the instructions in the request packet and send another response corresponding to the request. At this time, the configuration method proceeds to step S109. In step S109, the another response from the DHCP server 2 is received through the transceiver circuit 10, and the another response is forwarded to the client device 3. In this way, the client device 3 can acquire an IP address to connect to the target network. In detail, the IP address acquired by the client device 3 requesting to obtain the IP address will be different from the IP address of the wireless repeater device 1, and the assignment of the acquired IP address is managed by the DHCP server 2.

In other words, the wireless repeater device 1 can detect the transmission modes supported by the DHCP server 2 by sending the detection packet, and then the wireless repeater device 1 can use the above process to, according to actions of the client device 3 sending the request, dynamically switch the mode supported by the DHCP server 2, such that the client device 3 can be successfully connected to the target network.

In conclusion, the wireless repeater device and the configuration method for the same provided by the present disclosure can dynamically detect the transmission modes supported by the target network for dynamically acquiring the IP address, without the need for the client device to try and connect to the network through the wireless repeater device. The wireless repeater device can be used by the client device to forward the request for acquiring the IP address to the target network through the detected transmission mode, thereby increasing the wireless network coverage and improving the network connection efficiency through the wireless repeater device without limiting the compatibility of transmission modes, such that wireless networking devices can be more adaptive.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless repeater device, comprising:
a transceiver circuit; and
a control circuit connected to the transceiver circuit and configured for operating the following through the transceiver circuit:
    connecting to a target network provided by a Dynamic Host Configuration Protocol (DHCP) server;
    dynamically acquiring an Internet Protocol (IP) address from the DHCP server;
    sending a detection packet to the target network to confirm a first transmission mode and a second transmission mode supported by the DHCP server, wherein the detection packet indicates that the wireless repeater device is a DHCP relay agent;
    confirming whether a client device is connected;
    in response to confirming that the client device is connected, confirming whether a request for dynamically acquiring an IP address sending from the client device is received;
    in response to confirming that the request is received, forwarding a request packet carrying the request to the DHCP server of the target network, wherein the request packet instructs the DHCP server to respond in the first transmission mode;
    receiving a response corresponding to the request from the DHCP server, and forwarding the response to the client device;
    confirming whether a transmission of the request from the client device is still received;
    in response to confirming that the transmission of the request is still received, modifying the request packet carrying the request and forwarding the modified request packet to the DHCP server, wherein the request packet is modified to instruct the DHCP server to respond in the second transmission mode; and
    receiving another response corresponding to the request from the DHCP server, and forwarding the another response to the client device, such that the client device acquires another IP address to connect to the target network.

2. The wireless repeater device according to claim 1, wherein when the control circuit being configured for confirming the first transmission mode and the second transmission mode supported by the DHCP server, the control circuit is further configured for operating the following through the transceiver circuit:
    confirming whether the target network responds a detection response packet in response to the detection packet;
    in response to receiving the detection response packet, confirming whether a source port and a destination port corresponding to the detection response packet are both DHCP server ports; and
    in response to confirming that the source port and the destination port corresponding to the detection packet are both the DHCP server ports, recording a response record in the detection response packet and marking the first transmission mode and the second transmission mode supported by the DHCP server.

3. The wireless repeater device according to claim 1, wherein in response to the request packet instructing that the DHCP server responds in the first transmission mode or the second transmission mode, the DHCP server sends the response corresponding to the request in the first transmission mode or the second transmission mode when the request packet is received.

4. The wireless repeater device according to claim 3, wherein the request packet includes a transmission mode field that identifies information for instructing the DHCP server to respond in the first transmission mode or the second transmission mode.

5. The wireless repeater device according to claim 1, wherein the first transmission mode is a unicast mode, and the second transmission mode is a broadcast mode.

6. The wireless repeater device according to claim 1, wherein the control circuit is configured for entering a client mode to dynamically acquire the IP address from the DHCP server through the transceiver circuit.

7. The wireless repeater device according to claim 1, wherein the detection packet includes an indication field that identifies information for indicating whether the wireless repeater device is the DHCP relay agent or a DHCP client.

8. A configuration method for a wireless repeater device, the wireless repeater device including a transceiver circuit and a control circuit connected to the transceiver circuit, the configuration method comprising:
configuring the control circuit for operating the following through the transceiver circuit:
connecting to a target network provided by a Dynamic Host Configuration Protocol (DHCP) server;
dynamically acquiring an Internet Protocol (IP) address from the DHCP server;
sending a detection packet to the target network to confirm a first transmission mode and a second transmission mode supported by the DHCP server, wherein the detection packet indicates that the wireless repeater device is a DHCP relay agent;
confirming whether a client device is connected;
in response to confirming that the client device is connected, confirming whether a request for dynamically acquiring an IP address sending from the client device is received;
in response to confirming that the request is received, forwarding a request packet carrying the request to the DHCP server of the target network, wherein the request packet instructs the DHCP server to respond in the first transmission mode;
receiving a response corresponding to the request from the DHCP server, and forwarding the response to the client device;
confirming whether a transmission of the request from the client device is still received;
in response to confirming that the transmission of the request is still received, modifying the request packet carrying the request and forwarding the modified request packet to the DHCP server, wherein the request packet is modified to instruct the DHCP server to respond in the second transmission mode; and
receiving another response corresponding to the request, and forwarding the another response to the client device, such that the client device acquires another IP address to connect to the target network.

9. The configuration method according to claim 8, wherein a step of configuring the control circuit for confirming the first transmission mode and the second transmission mode supported by the DHCP server further includes configuring the control circuit for operating the following through the transceiver circuit:
confirming whether the target network responds a detection response packet in response to the detection packet;
in response to receiving the detection response packet, confirming whether a source port and a destination port corresponding to the detection response packet are both DHCP server ports; and
in response to confirming that the source port and the destination port corresponding to the detection packet are both the DHCP server ports, recording a response record in the detection response packet and marking the first transmission mode and the second transmission mode supported by the DHCP server.

10. The configuration method according to claim 8, wherein in response to the request packet instructing that the DHCP server responds in the first transmission mode or the second transmission mode, the DHCP server sends the response corresponding to the request in the first transmission mode or the second transmission mode when the request packet is received.

11. The configuration method according to claim 10, wherein the request packet includes a transmission mode field that identifies information for instructing the DHCP server to respond in the first transmission mode or the second transmission mode.

12. The configuration method according to claim 8, wherein the first transmission mode is a unicast mode, and the second transmission mode is a broadcast mode.

13. The configuration method according to claim 8, wherein the control circuit is configured for entering a client mode to dynamically acquire the IP address from the DHCP server through the transceiver circuit.

14. The configuration method according to claim 8, wherein the detection packet includes an indication field that identifies information for indicating whether the wireless repeater device is the DHCP relay agent or a DHCP client.

* * * * *